(12) United States Patent
Hirano et al.

(10) Patent No.: US 7,638,199 B2
(45) Date of Patent: Dec. 29, 2009

(54) GLASS SUBSTRATE HAVING PRIMER LAYER FORMED THEREON AND ANTI-FOGGING ARTICLE

(75) Inventors: Toshihiro Hirano, Mie (JP); Toru Hirotsu, Mie (JP); Noboru Murata, Mie (JP); Masahiro Hirukawa, Mie (JP); Nobuyuki Itakura, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 386 days.

(21) Appl. No.: 10/582,362

(22) PCT Filed: Nov. 25, 2004

(86) PCT No.: PCT/JP2004/017446

§ 371 (c)(1), (2), (4) Date: Jun. 9, 2006

(87) PCT Pub. No.: WO2005/056488

PCT Pub. Date: Jun. 23, 2005

(65) Prior Publication Data

US 2007/0099000 A1    May 3, 2007

(30) Foreign Application Priority Data

Dec. 10, 2003  (JP) ............... 2003-411615
Oct. 15, 2004  (JP) ............... 2004-300997

(51) Int. Cl.
*B32B 15/00* (2006.01)
*B05D 1/36* (2006.01)
*B05D 7/00* (2006.01)

(52) U.S. Cl. ............... 428/432; 428/428; 428/441; 428/447; 428/448; 428/451; 428/500; 428/689; 427/407.1; 427/407.2; 427/419.1; 427/419.8

(58) Field of Classification Search ............... None
See application file for complete search history.

(56) References Cited

U.S. PATENT DOCUMENTS

| 2,512,058 A * | 6/1950 | Gulledge ............... 528/25 |
| 2006/0154048 A1 | 7/2006 | Teranishi et al. |

FOREIGN PATENT DOCUMENTS

| EP | 0 842 908 A1 | 5/1998 |
| EP | 1 570 980 A1 | 9/2005 |
| JP | 05-339032 A | 12/1993 |
| JP | 07-331173 A | 12/1995 |
| JP | 11-158648 A | 6/1999 |
| JP | 2000-107709 A | 4/2000 |
| JP | 2000-308860 A | 11/2000 |
| JP | 2000-336334 A | 12/2000 |
| JP | 2001-192242 A | 7/2001 |
| WO | WO 2004/052640 A1 | 6/2004 |

OTHER PUBLICATIONS

Translation of JP-2001192242.*
Translation of JP-11-158648.*
International Search Report dated Feb. 15, 2005 (Two (2) pages).
Supplementary European Search Report dated Feb. 19, 2009 (Three (3) pages).

* cited by examiner

*Primary Examiner*—Ling Xu
(74) *Attorney, Agent, or Firm*—Crowell & Moring LLP

(57) ABSTRACT

The present invention relates to a glass substrate which is characterized in that it has a primer layer that is formed thereon and includes a hydrolysis product of a hydrolysable silicon compound having an alkylene group and a hydrolysis product of a hydrolysable zirconium compound or hydrolysable titanium compound, and that, in the primer layer, zirconium is in an amount by weight ratio of 0.0002 times to 0.0025 times that of silicon, or titanium is in an amount by weight ratio of 0.0005 times to 0.0045 times that of silicon. Furthermore, the present invention relates to an anti-fogging article having a resin film that exhibits water-absorptive property and/or hydrophilic property and is formed on the primer layer of the glass substrate.

16 Claims, No Drawings

GLASS SUBSTRATE HAVING PRIMER LAYER FORMED THEREON AND ANTI-FOGGING ARTICLE

TECHNICAL FIELD

The present invention relates to a technique to improve alkali resistance of an anti-fogging article comprising a glass substrate having a resin film that is formed thereon and exhibits water-absorptive and/or hydrophilic property.

BACKGROUND OF THE INVENTION

There has been conducted a surface modification of a glass substrate, in which a primer layer is formed by a silane coupling agent or the like, in order to form an adhesive layer, resin film or the like on a surface that is inferior in adhesion such as glass substrate surface (Patent Publication 1). As a technique related to the surface modification of a glass substrate, in which a primer layer is formed, Patent Publication 2 discloses a method for modifying a glass substrate surface, in which a primer layer is formed on the substrate surface, by using a single or mixture of at least two of a compound containing silicon, aluminum or titanium, in order to improve durability of a formed body comprising a glass substrate and a resin layer. It is recommended in Patent Publication 3 that an aminosilane series primer is previously applied to a glass substrate in order to form a urethane resin film on the glass substrate.

As described above, in order to form an adhesive layer or resin film on a glass substrate surface, it has generally been conducted to modify a glass substrate surface by forming a primer layer on the substrate surface by a hydrolysable silicon compound having an alkylene group, a so-called silane coupling agent.

However, in recent years, anti-fogging techniques of glass, mirror and the like have been put into practical use by using films exhibiting water-absorptive property and/or hydrophilic property. To seek a higher performance antifogging property, there have been developed anti-fogging glasses and anti-fogging mirrors using urethane resin, acrylic resin, polyolefin resin, epoxy resin and the like, which are provided with water-absorptive property and/or hydrophilic property. Anti-fogging glasses and anti-fogging mirrors having a film that is formed thereon and exhibits water-absorptive property and/or hydrophilic property tend to be contaminated with coloring agent, household water, rain water, rinse and the like. In the case of using them in a washstand or bathroom, this problem becomes particularly conspicuous. As a method of eliminating this contamination, Patent Publications 4 and 5 disclose methods for washing films with alkali solutions.

Patent Publication 1: Japanese Patent Laid-open Publication 5-339032
Patent Publication 2: Japanese Patent Laid-open Publication 11-158648
Patent Publication 3: Japanese Patent Laid-open Publication 2001-192242
Patent Publication 4: Japanese Patent Laid-open Publication 2000-107709
Patent Publication 5: Japanese Patent Laid-open Publication 2000-308860

SUMMARY OF THE INVENTION

In the case of washing an anti-fogging article comprising a glass substrate having a resin film formed thereon with an alkali solution (particularly a solution of a pH value of 10 to 14), a malfunctioning such as exfoliation of the film tends to occur. This phenomenon becomes particularly conspicuous in case that the resin film has water-absorbing property. In order to use the anti-fogging article for a long time, it is necessary to improve alkali-washing resistance. Therefore, it is an object of the present invention to improve alkali-washing resistance of the anti-fogging article.

According to the present invention, there is provided a glass substrate having a primer layer that is formed thereon and comprises a hydrolysis product of a hydrolysable silicon compound having an alkylene group and a hydrolysis product of a hydrolysable zirconium compound or hydrolysable titanium compound, the glass substrate being characterized in that, in the primer layer, zirconium is in an amount by weight ratio of 0.0002 times to 0.0025 times that of silicon, or titanium is in an amount by weight ratio of 0.0005 times to 0.0045 times that of silicon.

According to the present invention, there is provided an anti-fogging article in which a resin film exhibiting water-absorptive property and/or hydrophilic property is formed on a primer layer of the above glass substrate.

According to the present invention, in a method for washing the above anti-fogging article, there is provided a washing method characterized in that an alkali solution is used.

According to the present invention, there is provided a coating liquid for obtaining the above primer layer, the coating liquid being characterized in that it has a hydrolysable silicon compound and/or hydrolysate having an alkylene group, and a hydrolysable zirconium compound and/or hydrolysate or a hydrolysable titanium compound and/or hydrolysate and that it has a pH value of 2 or lower.

DETAILED DESCRIPTION

The present inventors have eagerly sought the cause of malfunctioning such as exfoliation of a resin film in case that an anti-fogging article comprising a glass substrate having a resin film formed thereon is washed with an alkali solution. With this, we have found that the alkali solution reaches an interface between the resin film and the primer layer, thereby making the exfoliation occur at the interface. In the present invention, the primer layer is a layer that is formed for improving adhesion between the glass substrate surface and the resin film, and its thickness refers to, for example, about 1 nm to 10 nm.

The anti-fogging article of the present invention is superior in alkali washing resistance. The above ratio of zirconium to silicon or ratio of titanium to silicon has been found by examining alkali-washing resistance. If zirconium is less than 0.0002 times and is greater than 0.0025 times that of silicon, or if titanium is less than 0.0005 times and is greater than 0.0045 times that of silicon, alkali washing resistance becomes deficient.

It is necessary to make the coating liquid (solution) have a pH value of 2 or lower in order to accelerate the hydrolyses and polycondensation of the silicon compound and the zirconium compound and to improve adhesion between the primer layer and the substrate. If the pH of the solution is adjusted to a neutral range, the polycondensation is slow. Therefore, it is not preferable. If the pH of the solution is adjusted to a basic range, the reaction products of the silicon compound and the zirconium compound take granular forms, and it becomes difficult to form the primer layer.

A hydrolysis product in the present invention refers to one having a condition in which a polycondensation reaction of the hydrolysable compound has been accelerated or a condition in which the polycondensation has terminated. The hydrolysate refers to one in which the polycondensation is under the initial condition (condition of monomer, dimer, trimer or the like) or under the condition of oligomer.

An anti-fogging article of the present invention, in which a resin film is formed on a primer layer, becomes superior in alkali resistance. In case that a resin film exhibits water-absorptive property and/or hydrophilic property, even if the resulting anti-fogging article, such as anti-fogging glass or anti-fogging mirror, is brought into contact with an alkali solution, exfoliation of the film hardly occurs, it comes to easy washing of the film, and it succeeds in long-time use of anti-fogging article.

As a hydrolysable silicon compound having an alkylene group, which is contained in the coating liquid, it is possible to use monomethylsilanol, dimethylsilanol, trimethylsilanol, silanol(tetrahydroxysilane), monoethylsilanol, diethylsilanol, triethylsilanol, monopropylsilanol, dipropylsilanol, tripropylsilanol, triisopropylsilanol, diphenylsilane diol, 3-glycidoxypropyltrimethoxysilane, 2-(3,4-epoxycyclohexyl)ethyltrimethoxysilane, aminopropyltriethoxysilane, N-phenyl-3-aminopropyltrimethoxysilane, and the like.

As the hydrolysable zirconium compound, it is possible to use zirconium oxychloride, zirconium nitrate, zirconium acetate, alkoxide compounds and the like. Of these, it is preferable to use zirconium oxychloride, which can easily adjust pH of the solution to 2 or lower.

As the hydrolysable titanium compound, it is possible to use titanium oxychloride, titanium nitrate, titanium acetate, alkoxide compounds and the like. Of these, it is preferable to use titanium oxychloride, which can easily adjust pH of the solution to 2 or lower.

A solution to be applied to the glass substrate surface is prepared by diluting or dissolving the silicon compound and the zirconium compound or titanium compound with a solvent. As the solvent, it is possible to use alcohols, for example, lower alcohols such as methyl alcohol, ethyl alcohol, propyl alcohol and isopropyl alcohol, or general organic solvents of paraffin series hydrocarbons and aromatic hydrocarbons, for example, n-hexane, toluene and chlorobenzene, or mixtures of these.

In order to adjust pH of the coating liquid, it is optional to introduce an acid of hydrochloric acid, nitric acid or acetic acid. In order to accelerate the hydrolyses of the silicon compound and the zirconium compound, it is optional to introduce a small amount of water. In order to efficiently form the primer layer, it is preferable to adjust the total amount of the silicon compound and the zirconium compound or titanium compound to 1.0 wt % to 1.4 wt % relative to the solvent.

As a method for applying the coating liquid to the glass substrate surface, it is possible to use known means such as spraying, bar coating, roller coating, spin coating, brush coating, and dip coating.

For a glass substrate in the present invention, it is possible to use plate glasses that are normally used as automotive, architectural and industrial glasses. They are ones obtained by float method, duplex method, roll out method and the like. Their production methods are not particularly limited. As the glass type, it is possible to use various color glasses such as green and bronze as well as clear; various functional glasses such as UV and IR shielding glasses and electromagnetic shielding glasses; glasses usable for fire-retarding glasses such as wired glass, low-expansion glass and zero expansion glass; tempered glass and its analogous glasses; laminated glass, double glazing and the like; mirrors prepared by silvering or vacuum film forming method; and various glass products such as flat plate and bent plate. Although the plate thickness is not particularly limited, it is preferably 1.0 mm to 10 mm. It is preferably 1.0 mm to 5.0 mm for vehicular use.

For the resin film, it is possible to use urethane resin, acrylic resin, epoxy resin, olefinic resin, nylon resin, polyethylene terephthalate, polyethylene, vinyl chloride resin, polyvinyl alcohol, polycarbonate, and the like. As a resin that has visible light transparency and exhibits water-absorptive property and/or hydrophilic property, it is possible to preferably use urethane resin, acrylic resin, epoxy resin, olefinic resin, and polyvinyl alcohol.

Of these, as a resin having water-absorptive property, urethane resins obtained by reacting isocyanate compounds with oxyalkylene-chain containing polyols, such as polyethylene glycol, propylene glycol, and oxyethylene/oxypropylene copolymer polyols; polyester polyols such as caprolactone polyol and polycarbonate polyol; and polyols such as short-chain polyols are preferable.

As a resin having water-absorptive property and hydrophilic property, a urethane resin obtained by adding a surfactant, particularly a surfactant having an isocyanate reactive group, to the above chemical species is particularly preferable.

In the following, the present invention is specifically described by examples.

EXAMPLE 1

A preparation was conducted to make 1 wt % of a hydrolysable silicon compound having an alkylene group, γ-aminopropyltriethoxysilane (LS-3150, made by Shin-Etsu Silicones Co.), with a modified alcohol (EKINEN F-1, made by Kishida Chemical Co., Ltd.) formed of 90 wt % ethanol and 10 wt % isopropyl alcohol, thereby obtaining a solution. A hydrolysable zirconium compound, zirconium oxychloride octahydrate, was added to the solution such that the amount of zirconium of the zirconium compound becomes 0.0008 times that of silicon of the silicon compound, thereby obtaining a coating liquid that has a pH value of 1.5 and is for obtaining a primer layer.

The solution was applied by wiping a float glass substrate surface with a wiper (trade name: BENKOT, type M-1, 50 mm×50 mm, made by OZU CORPORATION) formed of cellulose fibers by which the solution was absorbed, followed by drying under room temperature condition and then rinsing the film surface with a wiper using tap water, thereby obtaining a glass substrate having a primer layer formed thereon.

A solution was prepared such that film forming components of a solution (trade name: "VISGARD" A component, made by Film Specialties Co.) having a surfactant having an isocyanate reactive group, polycaprolactone diol (trade name: "PLACCEL L212AL" made by DAICEL CHEMICAL INDUSTRIES, LTD), polyethylene glycol having a number average molecular weight of 1,000, glycerol ethoxide (trade name: "GE200" made by SANYO KASEI), which is a short-chain polyol, and a biuret-type polyisocyanate of hexamethylenediisocyanate (trade name: "N3200" of Sumitomo Bayer Urethane Co.) become 30:5:5:5:55 by weight ratio. Then, the solution was applied to the primer layer of the glass substrate surface by bar coating method.

The article was dried by heating at 150° C. for 30 min, thereby obtaining an anti-fogging article having a glass substrate having a resin film that is formed thereon and exhibits water-absorptive property and hydrophilic property. The film thickness of the resin film of the anti-fogging article was 20 μm, the water absorption was 15%, and the contact angle of a water drop to the resin film was 25 degrees.

The water absorption of the resin film was determined by a formula of [b−a]/[a−(the weight of the mirror proper)]×100 (%), wherein the weight of the anti-fogging mirror, when the anti-fogging article had been maintained in an environment of 50% humidity and 55° C. temperature for 12 hours and then maintained in an environment of the same humidity and 25° C. temperature for 12 hours, was defined as "a", and the weight of the anti-fogging mirror, of which film had been subjected to a contact with 43° C. saturated water vapor for 5 min, followed by an immediate wiping of the water film of the film surface, was defined as "b". The contact angle of a water drop of the resin film was measured in accordance with JIS R 3257 "Substrate Glass Surface Wetting Test Method". The anti-fogging article cut into a 100 mm square was maintained for 12 hours in an environment of 50% humidity and 55° C. temperature and then maintained for 12 hours in an environment of the same humidity and 25° C. temperature, thereby having a condition in which water is not absorbed by the film. A contact angle meter (CA-2 type) made by Kyowa Interface Science Co., Ltd. was installed on the film surface on the level, water of 2 μl was dropped onto the film, and that was obtained by measuring the contact angle of the water drop.

The obtained anti-fogging article was brought into contact with a wiper (trade name: BENKOT, type M-1, 50 mm×50 mm, made by OZU CORPORATION) formed of cellulose fibers impregnated with an anti-mold detergent (trade name: "KABI KILLER" made by JOHNSON COMPANY LIMITED) having a pH value of 13, and the anti-fogging article was sealed to prevent the alkali solution from evaporating, and it was maintained for 48 hours. After that, the contacted part was rinsed. This test is defined as an alkali-washing test. After this test, the external appearance was evaluated. With this, abnormality was not found.

After the alkali-washing test, fogging did not occur by blowing a breath against the alkali-washing test part. Furthermore, the film was exposed to 43° C. saturated water vapor for 3 minutes, and it was taken out to room temperature (23° C.; humidity: 63%). Then, a breath was blown against the alkali washing part, but fogging did not occur.

EXAMPLE 2

Except that the amount of zirconium of the hydrolysable zirconium compound was made to become 0.0002 times that of silicon of the hydrolysable silicon compound having an alkylene group, an anti-fogging member was obtained by a procedure similar to that of Example 1, and an alkali-washing test and an anti-fogging evaluation after the alkali-washing evaluation were conducted by a procedure similar to that of Example 1. As a result, no external abnormality was found in the alkali-washing test, and no fogging occurred even in the anti-fogging evaluation.

EXAMPLE 3

Except that the amount of zirconium of the hydrolysable zirconium compound was made to become 0.002 times that of silicon of the hydrolysable silicon compound having an alkylene group, an anti-fogging member was obtained by a procedure similar to that of Example 1, and an alkali-washing test and an anti-fogging evaluation after the alkali-washing evaluation were conducted by a procedure similar to that of Example 1. As a result, no external abnormality was found in the alkali-washing test, and no fogging occurred even in the anti-fogging evaluation.

EXAMPLE 4

Except that zirconium nitrate dihydrate was used as the hydrolysable zirconium compound, an anti-fogging member was obtained by a procedure similar to that of Example 3, and an alkali washing test and an anti-fogging evaluation after the alkali washing evaluation were conducted by a procedure similar to that of Example 1. As a result, no external abnormality was found in the alkali-washing test, and no fogging occurred even in the anti-fogging evaluation.

EXAMPLE 5

Except that film forming components of a solution (trade name: "VISGARD" A component, made by Film Specialties Co.) having a surfactant having an isocyanate reactive group, polycarbonate polyol (trade name: "PC-61" made by NIPPON POLYURETHANE INDUSTRY CO., LTD.), polyethylene glycol having a number average molecular weight of 1,000, glycerol ethoxide (trade name: "GE200" made by SANYO KASEI), which is a short-chain polyol, and a biuret-type polyisocyanate of hexamethylenediisocyanate (trade name: "N3200" of Sumitomo Bayer Urethane Co.) were adjusted to 37:10:5:48 by weight ratio in the preparation of the solution for obtaining the resin film, an anti-fogging member was obtained by a procedure similar to that of Example 1.

The resin film in the sample had a film thickness of 151 μm, the water absorption evaluated in a procedure similar to that of Example 1 was 25%, and the contact angle of a water drop to the resin was 20 degrees. By a procedure similar to that of Example 1, an alkali-washing test of the sample and an anti-fogging evaluation after the alkali washing evaluation were conducted. As a result, no external abnormality was found in the alkali-washing test, and no fogging occurred even in the anti-fogging evaluation.

EXAMPLE 6

Except that, in place of the hydrolysable zirconium compound, titanium oxychloride, which was a hydrolysable titanium compound, was added such that the amount of titanium of the titanium compound becomes 0.002 times that of silicon of the silicon compound by weight ratio and that pH value of the coating liquid was adjusted to 1.5, an anti-fogging member was obtained by a procedure similar to that of Example 1, and an alkali washing test and an anti-fogging evaluation after the alkali washing evaluation were conducted by a procedure similar to that of Example 1. As a result, no external abnormality was found in the alkali-washing test, and no fogging occurred even in the anti-fogging evaluation.

EXAMPLE 7

Except that the addition was conducted such that the amount of titanium of the titanium compound becomes 0.0005 times that of silicon of the silicon compound by weight ratio and that pH value of the coating liquid was adjusted to 1.5, an anti-fogging member was obtained by a procedure similar to that of Example 6, and an alkali washing test and an anti-fogging evaluation after the alkali washing evaluation were conducted by a procedure similar to that of Example 1. As a result, no external abnormality was found in the alkali-washing test, and no fogging occurred even in the anti-fogging evaluation.

EXAMPLE 8

Except that the addition was conducted such that the amount of titanium of the titanium compound becomes 0.0044 times that of silicon of the silicon compound by weight ratio and that pH value of the coating liquid was adjusted to 1.5, an anti-fogging member was obtained by a procedure similar to that of Example 6, and an alkali washing test and an anti-fogging evaluation after the alkali washing evaluation were conducted by a procedure similar to that of Example 1. As a result, no external abnormality was found in the alkali-washing test, and no fogging occurred even in the anti-fogging evaluation.

COMPARATIVE EXAMPLE 1

A procedure similar to that of Example 1 was conducted, except in that the hydrolysable zirconium compound was not used. As a result of conducting the alkali-washing test, the resin film exfoliated when the contact time was 8 hours.

COMPARATIVE EXAMPLE 2

Except that the amount of zirconium of the hydrolysable zirconium compound was made to become 0.0001 times that of silicon of the hydrolysable silicon compound having an alkylene group, a sample was obtained by a procedure similar to that of Example 1, and an alkali-washing test was conducted by a procedure similar to that of Example 1. As a result, the resin film exfoliated when the contact time was 16 hours.

COMPARATIVE EXAMPLE 3

Except that the amount of titanium of the hydrolysable titanium compound was made to become 0.0004 times that of silicon of the hydrolysable silicon compound having an alkylene group, a sample was obtained by a procedure similar to that of Example 6, and an alkali-washing test was conducted by a procedure similar to that of Example 1. As a result, the resin film exfoliated when the contact time was 14 hours.

COMPARATIVE EXAMPLE 4

Except that the amount of zirconium of the hydrolysable zirconium compound was made to become 0.003 times that of silicon of the hydrolysable silicon compound having an alkylene group, a sample was obtained by a procedure similar to that of Example 1, and an alkali-washing test was conducted by a procedure similar to that of Example 1. As a result, the resin film exfoliated when the contact time was 16 hours.

COMPARATIVE EXAMPLE 5

Except that the amount of titanium of the hydrolysable titanium compound was made to become 0.005 times that of silicon of the hydrolysable silicon compound having an alkylene group, a sample was obtained by a procedure similar to that of Example 1, and an alkali-washing test was conducted by a procedure similar to that of Example 1. As a result, the resin film exfoliated when the contact time was 17 hours.

The invention claimed is:

1. An anti-fogging article comprising:
   a glass substrate proper;
   a primer layer formed on the glass substrate proper, the primer layer containing a hydrolysis product of a hydrolysable silicon compound having an alkylene group and a hydrolysis product of a hydrolysable zirconium compound or hydrolysable titanium compound; and
   a resin film formed on the primer layer, the resin film exhibiting water-absorptive property and/or hydrophilic property,
   wherein, when the primer layer contains the hydrolysis product of the hydrolysable zirconium compound, zirconium contained in the primer layer is in an amount by weight ratio of 0.0002 times to 0.0025 times that of silicon contained in the primer layer,
   wherein, when the primer layer contains the hydrolysis product of the hydrolysable titanium compound, titanium contained in the primer layer is in an amount by weight ratio of 0.0005 times to 0.0045 times that of silicon contained in the primer layer.

2. An anti-fogging article according to claim 1, wherein a resin of the resin film is selected from the group consisting of urethane resins, acrylic resins, epoxy resins, olefinic resins, nylon resins, polyethylene terephthalate, polyethylene, vinyl chloride resins, polyvinyl alcohol, and polycarbonate.

3. An anti-fogging article according to claim 2, wherein the resin of the resin film is a urethane resin.

4. An anti-fogging article according to claim 2, wherein the resin of the resin film is a urethane resin obtained from a raw material comprising a surfactant having an isocyanate reactive group.

5. An anti-fogging article according to claim 2, wherein the anti-fogging article has at least water-absorptive property.

6. An anti-fogging article according to claim 1, wherein the primer layer has a thickness of from about 1 nm to about 10 nm.

7. An anti-fogging article according to claim 1, wherein the hydrolysable silicon compound is selected from the group consisting of monomethylsilanol, dimethylsilanol, trimethylsilanol, silanol, monoethylsilanol, diethylsilanol, triethylsilanol, monopropylsilanol, dipropylsilanol, tripropylsilanol, triisopropylsilanol, diphenylsilane diol, 3-glycidoxypropyltrimethoxysilane, 2-(3,4-epoxycyclohexyl)ethyltrimethoxysilane, aminopropyltriethoxysilane, and N-phenyl-3-aminopropyltrimethoxysilane.

8. An anti-fogging article according to claim 7, wherein the hydrolysable silicon compound is aminopropyltriethoxysilane.

9. An anti-fogging article according to claim 1, wherein the hydrolysable zirconium compound is selected from the group consisting of zirconium oxychloride, zirconium nitrate, zirconium acetate, and alkoxide compounds.

10. An anti-fogging article according to claim 9, wherein the hydrolysable zirconium compound is zirconium oxychloride.

11. An anti-fogging article according to claim 1, wherein the hydrolysable titanium compound is selected from the group consisting of titanium oxychloride, titanium nitrate, titanium acetate, and alkoxide compounds.

12. An anti-fogging article according to claim 11, wherein the hydrolysable titanium compound is titanium oxychloride.

13. A process of using an anti-fogging article according to claim 1, comprising washing the anti-fogging article with an alkali solution.

14. A process for producing an anti-fogging article, the anti-fogging article comprising:
   a glass substrate proper;
   a primer layer formed on the glass substrate proper, the primer layer containing a hydrolysis product of a hydrolysable silicon compound having an alkylene group and a hydrolysis product of a hydrolysable zirconium compound or hydrolysable titanium compound; and a resin film formed on the primer layer, the resin film exhibiting water-absorptive property and/or hydrophilic property, wherein, when the primer layer contains the hydrolysis product of the hydrolysable zirconium compound, zirconium contained in the primer layer is in an amount by weight ratio of 0.0002 times to 0.0025 times that of silicon contained in the primer layer, wherein, when the primer layer contains the hydrolysis product of the hydrolysable titanium compound, titanium contained in the primer layer is in an amount by weight ratio of 0.0005 times to 0.0045 times that of silicon contained in the primer layer, the process comprising the steps of:
(a) forming the primer layer on the glass substrate proper; and
(b) forming the resin film on the primer layer.

15. A process according to claim 14, wherein the step (a) is conducted by applying a coating liquid on the primer layer, the coating liquid comprising:

a hydrolysable silicon compound and/or hydrolysate having an alkylene group; and a hydrolysable zirconium compound and/or hydrolysate or a hydrolysable titanium compound and/or hydrolysate, wherein the coating liquid has a pH value of 2 or lower.

16. A process according to claim 15, wherein the coating liquid further comprises a solvent, and wherein the total amount of the silicon compound and the zirconium compound or titanium compound is 1.0 wt % to 1.4 wt % relative to the solvent.

* * * * *

UNITED STATES PATENT AND TRADEMARK OFFICE
CERTIFICATE OF CORRECTION

PATENT NO. : 7,638,199 B2  Page 1 of 1
APPLICATION NO. : 10/582362
DATED : December 29, 2009
INVENTOR(S) : Hirano et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 589 days.

Signed and Sealed this

Twenty-first Day of December, 2010

David J. Kappos
*Director of the United States Patent and Trademark Office*